United States Patent
Grove

Patent Number: 5,283,574
Date of Patent: Feb. 1, 1994

[54] ALTITUDE LOSS AFTER TAKE-OFF WARNING SYSTEM UTILIZING TIME AND ALTITUDE

[75] Inventor: Michael M. Grove, Kirkland, Wash.

[73] Assignee: Sundstrand Data Control, Inc., Redmond, Wash.

[21] Appl. No.: 81,562

[22] Filed: Jul. 31, 1987

Related U.S. Application Data

[63] Continuation of Ser. No. 704,366, Feb. 22, 1985, abandoned.

[51] Int. Cl.$^5$ .............................................. G08B 23/00
[52] U.S. Cl. .................................. 340/970; 340/963; 342/65; 364/433
[58] Field of Search ............... 340/963, 964, 970, 977; 73/178 T, 178 R; 244/180; 342/65; 364/433

[56] References Cited

U.S. PATENT DOCUMENTS

| | | | |
|---|---|---|---|
| 3,934,222 | 1/1976 | Bateman et al. | 340/970 |
| 3,946,358 | 3/1976 | Bateman | 340/970 |
| 3,947,808 | 3/1976 | Bateman | 340/970 |
| 3,947,810 | 3/1976 | Bateman et al. | 340/970 |
| 4,319,218 | 3/1982 | Bateman | 340/970 |
| 4,431,994 | 2/1984 | Gemin | 340/970 |
| 4,433,323 | 2/1984 | Grove | 340/970 |
| 4,495,483 | 1/1985 | Bateman | 340/970 |

FOREIGN PATENT DOCUMENTS

WO8503566 8/1985 PCT Int'l Appl. ............... 73/178 T

Primary Examiner—Joseph A. Orsino
Assistant Examiner—Brent A. Swarthout
Attorney, Agent, or Firm—Mason, Kolehmainen, Rathburn & Wyss

[57] ABSTRACT

Warning systems for aircraft that provide a warning to the pilot of an excessive altitude loss or an excessive descent rate after take-off as long as he is flying below a predetermined altitude have the problem that they require a valid radio altitude signal for proper operation, and tend to generate nuisance warnings when used in low flying aircraft. This problem is solved by comparing the accumulated altitude loss after take-off (12, 14, 62, 34) with the product of a barometrically derived altitude and the length of time the aircraft has been flying (12, 14, 30, 32, 34). A warning is generated if the altitude loss is excessive for the accumulated time-altitude product after take-off (38, 40). Thus, the system is more sensitive immediately after take-off and becomes less sensitive as flight time is accumulated to permit low level maneuvering without generating false or nuisance warnings, and does not require a valid radio altitude signal to generate a warning.

12 Claims, 2 Drawing Sheets

ALTITUDE LOSS AFTER TAKE-OFF WARNING SYSTEM UTILIZING TIME AND ALTITUDE

This application is a continuation of application Ser. No. 06/704,366, filed Feb. 22, 1985, now abandoned.

BACKGROUND OF THE INVENTION

1. Field of the Invention

This invention relates generally to the field of ground proximity warning systems, particularly to systems that warn of an excessive aircraft altitude loss after take-off or doing a go-around after a missed approach, and even more particularly, to systems wherein the warning criteria are altered as a function of elapsed time after take-off as well as the altitude above ground at which the aircraft is flying.

2. Description of the Prior Art

Ground proximity warning systems that warn of aircraft descent after take-off or during a go-around after a missed approach are known. Examples of such systems are disclosed in U.S. Pat. Nos. 3,946,358; 3,947,808; 3,947,810; 4,319,218 and 4,433,323 assigned to the assignee of the present invention. The systems disclosed in the '358 and '808 patents provide a warning if the descent rate of the aircraft exceeds a predetermined rate below a given altitude, and the systems disclosed in the '810; '218 and '323 patents generate a warning if the altitude loss exceeds a predetermined value before a predetermined altitude is reached. The '323 patent also discloses a system that switches between modes based on time and radio altitude.

While these systems provide a way to warn the pilot of an aircraft of a hazardous condition resulting from an excessive sink rate or from an excessive altitude loss after take-off or missed approach, these systems do not take into account the length of time that the aircraft has been flying in determining the warning envelopes. Consequently, such systems are not entirely suitable for aircraft whose operational characteristics are such that they are normally flown at low altitudes after take-off, because such systems can generate nuisance warnings during intentional low level maneuvering. In addition, many aircraft have radio altimeters that provide unreliable readings immediately after takeoff, and systems that rely solely on a radio altimeter for altitude information are generally inhibited until the radio altitude readings stabilize.

SUMMARY OF THE INVENTION

Accordingly, it is an object of the present invention to provide an excessive loss after take-off warning system that overcomes many of the disadvantages of the prior art systems.

It is another object of the present invention to provide an excessive altitude loss warning system particularly suitable for low flying aircraft.

It is another object of the present invention to provide an excessive altitude loss warning system that does not require a radio altitude signal to generate a warning.

It is yet another object of the present invention to provide an excessive altitude loss warning system having a warning envelope that is a function of both altitude and the length of time that the aircraft has been flying.

The operation and the flight characteristics of most aircraft, such as transport aircraft, are such that the aircraft tends to climb steadily after take-off. Should such an aircraft lose an excessive amount of altitude or sink at an excessively high rate prior to reaching a predetermined altitude, a hazardous situation can occur. Consequently, ground proximity warning systems have been developed to warn the pilot of an excessive sink rate or altitude loss at low altitudes. Such systems are generally deactivated to prevent nuisance warnings above a predetermined altitude where an inadvertent descent will not cause a potentially hazardous flight condition.

Certain other aircraft, particularly carrier based aircraft such as the Lockheed S3-A often take off, for example from the deck of a carrier, and continue to fly at low altitudes rather than continuing to climb as does, for example, a transport aircraft. Such low level flight after take-off is hazardous because if the pilot becomes distracted or disoriented, he may inadvertently allow the aircraft to descend into the ground or water. Such disorientation is particularly likely at night over water or in other areas where the pilot may lose visual reference after take-off and allow the aircraft to descend into the ground or water. Consequently, it is desirable to provide the pilot with a sensitive warning system that alerts him of an excessive descent after take-off. A sensitive system is particularly necessary because of the low altitude at which such aircraft fly. However, after take-off, such aircraft may engage in maneuvers that will cause warnings to be generated, even though the maneuvers being engaged in are intentional rather than inadvertent. One way to eliminate or reduce the frequency of occurrence of such nuisance warnings is to make the system less sensitive. Another way is to set the altitude above which the system is disabled to an altitude that is below the normal maneuvering altitude. However, neither of these approaches is entirely satisfactory because desensitizing the system will delay the warning and may not give the pilot sufficient warning time in the event of an inadvertent descent after take-off. Lowering the altitude above which a warning cannot be generated also poses problems, because if an inadvertent descent occurs at a higher altitude, no warning will be given.

Thus, the system according to the invention utilizes not only altitude, but also the length of time that the aircraft has been flying in order to determine the warning criteria. In the system according to the present invention, the system is structured to be most sensitive immediately after take-off when the aircraft is at low altitude and very little time into the flight has elapsed. The system is then desensitized both as a function of altitude and elapsed time into the flight, that is, the time-altitude product. Thus, at higher altitudes, greater descents are permitted before a warning is generated. Similarly, as more flight time elapses, and the pilot has had an opportunity to orient himself, greater descents are permitted until the system is disabled when enough altitude and/or flight time has been accumulated to indicate that this warning mode is no longer required. Because barometric altitude is used to generate the time-altitude product, a valid radio altitude signal is not required for the system to operate. This is particularly advantageous for aircraft that have radio altimeters that have long lock-on times, that is, that do not provide a valid radio altitude signal until several seconds after take-off.

DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1:
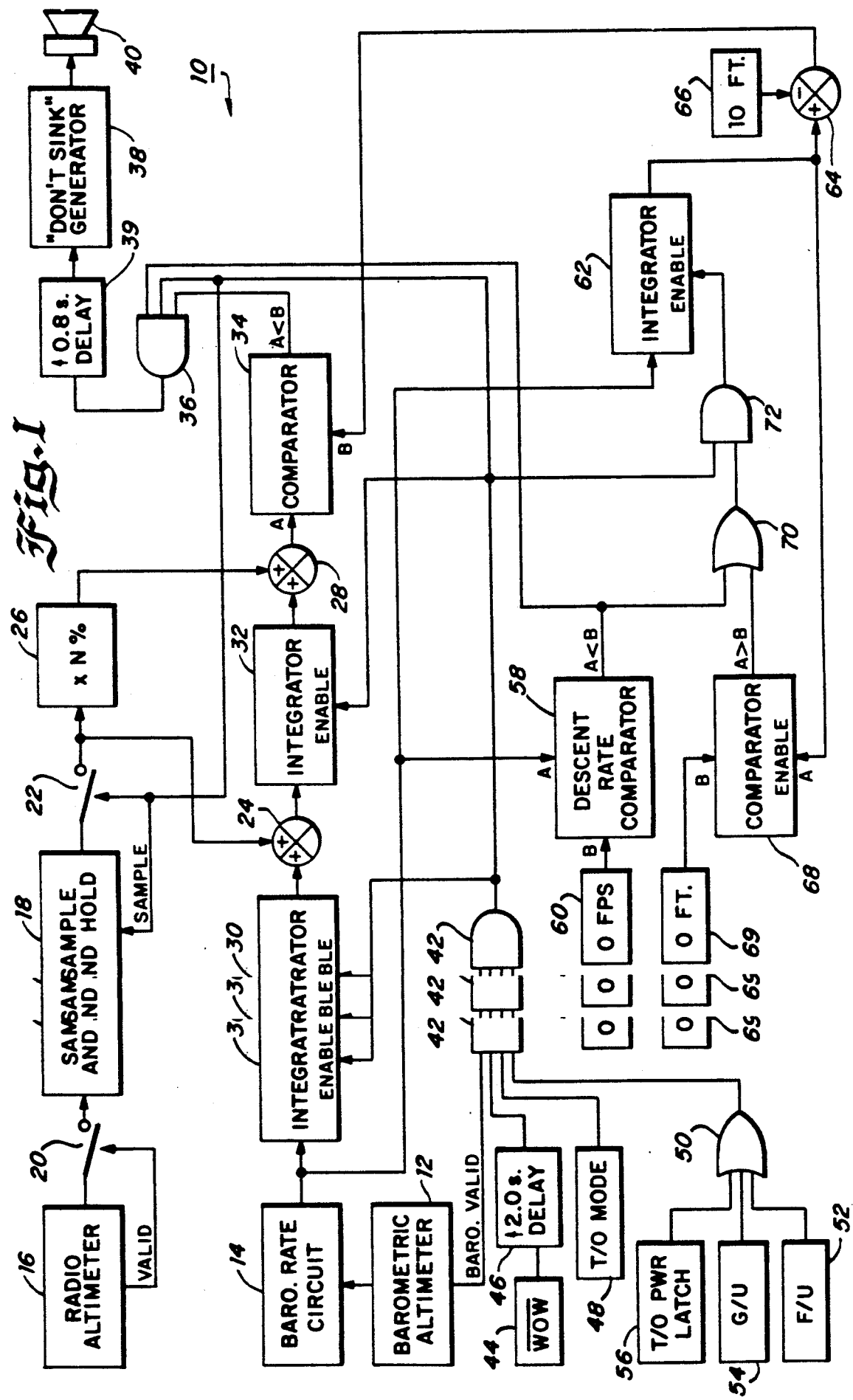
FIG. 1 is a functional block diagram of a warning system built in accordance with the principles of the present invention.

A system according to the invention capable of providing the warning function described above is illustrated in FIG. 1, and designated generally by the reference numeral 10. The system according to the invention is illustrated in FIG. 1 in functional or logical block diagram form as a series of gates, comparators and the like for purposes of illustration; however, it should be understood that the actual implementation of the logic can be other than as shown in FIG. 1, with various digital and analog implementations being possible. The signals used by the warning system as described include radio altitude, barometric altitude, barometric altitude rate, signals representative of the positions of the flaps and landing gear, signals representative of take-off power and whether the aircraft is in the take-off mode, a signal indicating whether there is any weight on the wheels and various validity signals. Depending on the type of aircraft in which the warning system is installed, the signals shown in FIG. 1 can be obtained from individual instruments such as a barometric altimeter 12, a barometric altitude rate circuit 14, a radio altimeter 16, and from discrete elements indicating whether the aircraft is in a take-off mode of flight, whether there is any weight on the wheels, and whether the flaps and landing gear are up or down. Also, a vertical velocity signal such as the Z-velocity signal from an inertial navigation signal may be used to provide the altitude rate signal instead of the barometric rate circuit. In certain newer aircraft the data may be received from a digital data bus.

The output of the radio altimeter 16 is applied to a sample and hold circuit 18 via a switch 20 that is closed only when the signal from the radio altimeter is valid. The output of the sample and hold circuit 18 is connected via a switch 22 to a summing junction 24 and to a scaling circuit 26 whose output is connected to a second summing junction 28. The output of the barometric rate circuit 14 is applied to an integrator 30 whose output is applied to the summing junction 24. The output of the summing junction 24 is applied to a second integrator 32 whose output is summed via junction 28 and coupled to a comparator 34. The output of the comparator 34 is coupled to an AND gate 36 whose output controls an aural warning generator 38 via delay circuit 39 that in turn operates a transducer 40.

Another one of the inputs of the AND gate 36 is coupled to the output of an AND gate 42 that also serves to enable the integrators 30 and 32. The AND gate 42 receives a no weight on wheels signal from a discrete 44 via a delay 46, a barometric altimeter valid signal from the barometric altimeter 12 and a take-off mode signal from take-off mode logic circuitry 48 that is standard on ground proximity warning systems such as the Mark II Ground Proximity Warning System manufactured by Sundstrand Data Control, Inc. The fourth input to the AND gate 42 is from a three-input OR gate 50 that receives signals from a flap up discrete 52, a gear up discrete 54 and a take-off power latch circuit 56. The take-off power logic and latching circuit 56 may be, for example, a circuit that monitors the tachometer of one or more of the engines of the aircraft and provides a takeoff power signal when the RPM of one or more engine is such that take-off power is indicated, and maintains that signal irrespective of power losses until such a time that other predetermined conditions exist which will clear the signals.

The third input of the AND gate 36 is coupled to the output of a descent comparator 58 that compares the output of the barometric rate circuit 14 with a reference signal representative of zero feet per second obtained from a reference source 60. Another integrator 62 integrates the barometric rate signal from the barometric rate circuit 14 and applies the integrated signal to one of the inputs of the comparator 34 via a summing junction 64 which also receives a signal representative of ten feet of altitude from a reference circuit 66. The output of the integrator 62 is also coupled to another comparator 68 which compares the output from the integrator 62 with a signal representative of zero feet of altitude received from a reference circuit 69. The output of the comparator 68 is coupled to an OR gate 70 that has another input coupled to the output of the descent comparator 58 and an output coupled to an AND gate 72. Another input of the AND gate 72 is coupled to the output of the AND gate 42, and the output of the AND gate 72 is coupled to an enable input of the integrator 62.

In operation, and assuming that the signals from the barometric altimeter 12 and the radio altimeter 16 are valid, the system is enabled by the AND gate 42 only when certain conditions are met. More specifically, the system is enabled only when there has been no weight on the wheels for more than 2 seconds and the aircraft is in the take-off mode and if the take-off power latch is set or the landing gear is up or the flaps are up. The delay circuit 46 delays the enabling of the system for approximately two seconds to permit the barometric altimeter signal to stabilize after take-off.

When the aforementioned conditions are met, the AND gate 42 applies enabling signals to the AND gates 36 and 72, to the integrators 30 and 32, and to the sample and hold circuit 18 and switch 22. Thus, upon enabling of the integrators 30 and 32, the barometric rate signal or other appropriate vertical velocity signal is integrated by the integrator 30 to provide a signal representative of altitude gain or loss. This signal is again integrated with respect to time by the integrator 32 to provide a time-altitude or feet-seconds signal. Also, immediately after take-off, and after the AND gate 42 is enabled, the output of the sample and hold circuit 18 is combined with the output of the integrator 30 to provide an altitude above ground reference signal for the output of the integrator 30. In the event that the radio altitude signal is not present, for example during a loss of track condition, the output of the sample and hold circuit 18 is zero feet, thereby assuming ground level reference. In addition, the output signal from the sample and hold circuit 18 is multiplied by a scaling factor such as, for example, 10%, by the scaling circuit 26 to provide a reference for the output of the integrator 32. The combined feet-seconds signal from the integrator 32 and the scaled reference signal from the scaling circuit 26 are combined and applied to the warning comparator 34 to be compared with the output from the integrator 62 received via the summing junction 64.

The combined effect of these circuits is to provide a true indication of accumulated feet-seconds of time-altitude when the system is initialized at some altitude above ground or sea level as might be the case in a missed approach, for example. The sampled radio altitude operates to include the initial altitude above ground or sea level in the time-altitude integration and also to increase the initial altitude loss required for a warning from 10 feet to 10 feet plus 10 per cent of current radio altitude, a value more consistent with conventional radio altitude based systems.

The integrator 62 integrates the output from the barometric rate circuit 14 to provide a signal representative of accumulated altitude loss after take-off. This occurs because the integrator 62 is enabled only when the aircraft is descending, or when an altitude loss has already occurred. The enabling function is accomplished by the descent rate comparator 58 and the comparator 68. The descent rate comparator 58 compares the descent rate signal from the barometric rate circuit 14 with a zero feet per second reference signal from the reference source 60, and provides an enabling signal to the integrator 62 via the gates 70 and 72 only if the aircraft is descending. The comparator 68 compares the output of the integrator 62 with a zero foot reference signal and maintains the integrator 62 enabled as long as the output of the integrator 62 is representative of an accumulated altitude loss. Thus, once enabled after an initial descent, the integrator 62 is maintained enabled until all of the lost altitude has been regained. The altitude loss signal is offset by 10 feet by the summing circuit 64 and applied to the comparator 34. Because of the 10 foot offset, the aircraft must descend at least 10 feet before any warning will be given to thereby minimize nuisances.

Figure 2:
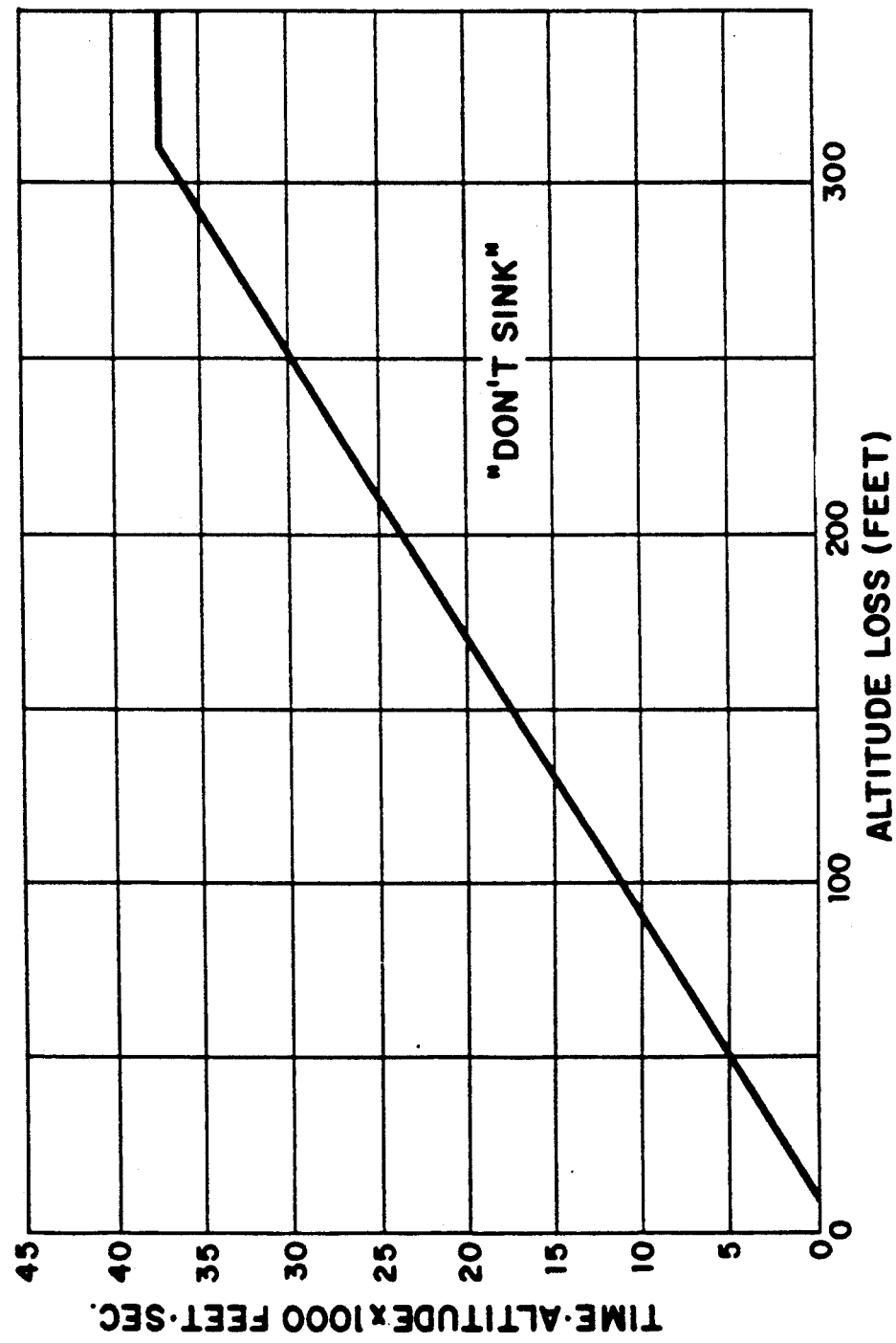
FIG. 2 is a graph illustrating the relationship between the time-altitude product and the altitude loss required for a warning to be generated.

The comparator 34 thus compares the accumulated altitude loss from the comparator 62 with the time-altitude or feet-seconds signal from the integrator 32 and provides a warning initiation signal to the gate 36 if the barometric altitude loss is excessive for the time-altitude product of the aircraft. This relationship is illustrated in FIG. 2. As is apparent from FIG. 2, during low altitudes or during the initial phases of flight when the time-altitude product is small, only 10 feet of altitude loss is permitted before a warning is generated. However, as the time-altitude product increases, the permitted altitude loss also increases until an altitude loss of 310 feet is permitted at a time-altitude product of 37,500 feet-seconds. Above 37,500 feet-seconds, the system is effectively disabled until the next take-off or the next go-around after a missed approach.

As was previously discussed, an aural warning informing the pilot of a hazardous condition has been found to be quite effective, and in the present embodiment, the gate 36 is used to cause the aural warning generator to generate a message such as "DON'T SINK" after an appropriate delay, for example 0.8 seconds, which serves to ignore momentary altitude loss excursions caused by signal noise. The message thus generated is applied to the transducer 40, which may be a loudspeaker or a pair of headphones, either directly or indirectly through the intercommunication system of the aircraft.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for providing a warning of a hazardous flight condition to the pilot of an aircraft during a takeoff or a go-around after a missed approach phase of flight, comprising:
    means for providing a signal representative of the loss of altitude, other than radar altitude, from an altitude peak reached during flight;
    means for providing a time-altitude signal that is a function of the altitude, other than radar altitude, of the aircraft and the length of time that the aircraft has been flying; and
    means responsive to the altitude loss representative signal and said time-altitude signal for generating an altitude loss warning as a function of the value of said time-altitude signal and the altitude loss representative signal.

2. A warning system as recited in claim 1 wherein said time-altitude signal providing means includes means responsive to the altitude rate of the aircraft for generating the time-altitude signal.

3. A warning system as recited in claim 2 wherein said altitude rate signal is a barometric rate signal.

4. A warning system as recited in claim 2 wherein said altitude rate signal is a vertical velocity signal.

5. A warning system as recited in claim 2 wherein said time-altitude signal providing means includes means for integrating the altitude rate signal to provide the altitude signal.

6. A warning system as recited in claim 5 wherein said time-altitude signal providing means includes means for integrating the altitude signal.

7. A warning system as recited in claim 6 wherein said time-altitude signal providing means includes means responsive to a signal representative of the radio altitude of the aircraft for sampling the radio altitude signal and combining the sampled radio altitude signal once the radio altitude signal is valid with the altitude signal.

8. A warning system for providing a warning of a hazardous flight condition to the pilot of an aircraft during takeoff or a go-around after a missed approach phase of flight, comprising:
    means for providing a signal representative of the rate of change of altitude, other than radar altitude, of the aircraft;
    means responsive to said altitude rate signal for twice integrating the rate of change of altitude signal to provide a time-altitude signal;
    means responsive to said rate of change of altitude signal for providing a signal representative of the accumulated altitude loss from an altitude peak attained by the aircraft; and
    means for comparing the time-altitude signal and the altitude loss signal and initiating a warning in the event of an excessive altitude loss relative to the value of the time-altitude signal.

9. A warning system as recited in claim 8 further including means for generating a signal representative of the altitude of the aircraft above ground and means for combining the altitude above ground signal with the time-altitude signal to modify the value of the time-altitude signal applied to the comparing means.

10. A warning system as recited in claim 9 wherein said time-altitude signal providing means includes means responsive to a signal representative of the radio altitude of the aircraft for sampling the radio altitude signal and combining the sampled radio altitude signal once the radio altitude signal is valid with the accumulated altitude loss signal.

11. A warning system as recited in claim 8 wherein the altitude rate signal is a barometric descent rate signal.

12. A warning system as recited in claim 8 wherein the altitude rate signal is a vertical velocity signal.

* * * * *

UNITED STATES PATENT AND TRADEMARK OFFICE
CERTIFICATE OF CORRECTION

PATENT NO. : 5,283,574
DATED : February 1, 1994
INVENTOR(S) : Grove

It is certified that error appears in the above-indentified patent and that said Letters Patent is hereby corrected as shown below:

Column 6, line 11, change "radar" to --radio--;

line 14, change "radar" to --radio--;

line 50, change "radar" to --radio--.

Signed and Sealed this

Sixth Day of September, 1994

Attest:

BRUCE LEHMAN

*Attesting Officer*          *Commissioner of Patents and Trademarks*